United States Patent
Bond et al.

(10) Patent No.: US 6,661,556 B2
(45) Date of Patent: Dec. 9, 2003

(54) STABILIZING ELECTRO-ABSORPTION MODULATORS (EAM'S) PERFORMANCE BY MAINTAINING CONSTANT ABSORPTION WITH THE USE OF INTEGRATED TAP COUPLERS

(75) Inventors: Aaron Bond, Orefield, PA (US); John Kai Andersen, Emmaus, PA (US); Ram Jambunathan, Allentown, PA (US)

(73) Assignee: T-Networks, Inc., Allentown, PA (US)

( * ) Notice: Subject to any disclaimer, the term of this patent is extended or adjusted under 35 U.S.C. 154(b) by 0 days.

(21) Appl. No.: 10/218,289

(22) Filed: Aug. 14, 2002

(65) Prior Publication Data

US 2003/0043448 A1 Mar. 6, 2003

Related U.S. Application Data

(60) Provisional application No. 60/314,789, filed on Aug. 24, 2001, and provisional application No. 60/335,166, filed on Nov. 1, 2001.

(51) Int. Cl.[7] ............................. G02F 1/03; G02F 1/035
(52) U.S. Cl. .......................... 359/245; 359/248; 385/2; 257/189
(58) Field of Search ................................. 359/245, 248; 385/1, 2, 3, 8, 131; 257/14, 96, 98, 30, 184, 189

(56) References Cited

U.S. PATENT DOCUMENTS

| | | | | |
|---|---|---|---|---|
| 4,872,744 A | * | 10/1989 | Abeles et al. | 257/189 |
| 5,402,259 A | * | 3/1995 | Lembo et al. | 359/245 |
| 5,528,413 A | * | 6/1996 | Ishimura | 359/245 |
| 5,784,188 A | * | 7/1998 | Nakamura et al. | 359/245 |
| 6,275,329 B1 | | 8/2001 | Sieben | 359/337.15 |
| 6,304,347 B1 | | 10/2001 | Beine et al. | 359/110 |

* cited by examiner

Primary Examiner—Scott J. Sugarman
Assistant Examiner—M. Hasan
(74) Attorney, Agent, or Firm—RatnerPrestia

(57) ABSTRACT

An exemplary monolithic stabilized monolithic transmissive active optical device, such as an electroabsorption modulator (EAM), a variable optical attenuator (VOA), or a semiconductor optical amplifier (SOA), with an output optical tap, includes: a substrate; a waveguide layer; a semiconductor layer. The waveguide layer is coupled to the substrate and includes an active medium, which interacts with a predetermined wavelength of light, and is responsive to an electric signal. The electric signal is applied between the substrate and the semiconductor layer. The waveguide layer includes an output optical tap section and an active section adjacent to the output optical tap section. These sections include portions of the active medium. Further embodiments of the present invention incorporate temperature as well as bias control to improve performance of exemplary monolithic transmissive active optical devices. Additional embodiments include exemplary methods of manufacture and methods of operation.

6 Claims, 20 Drawing Sheets

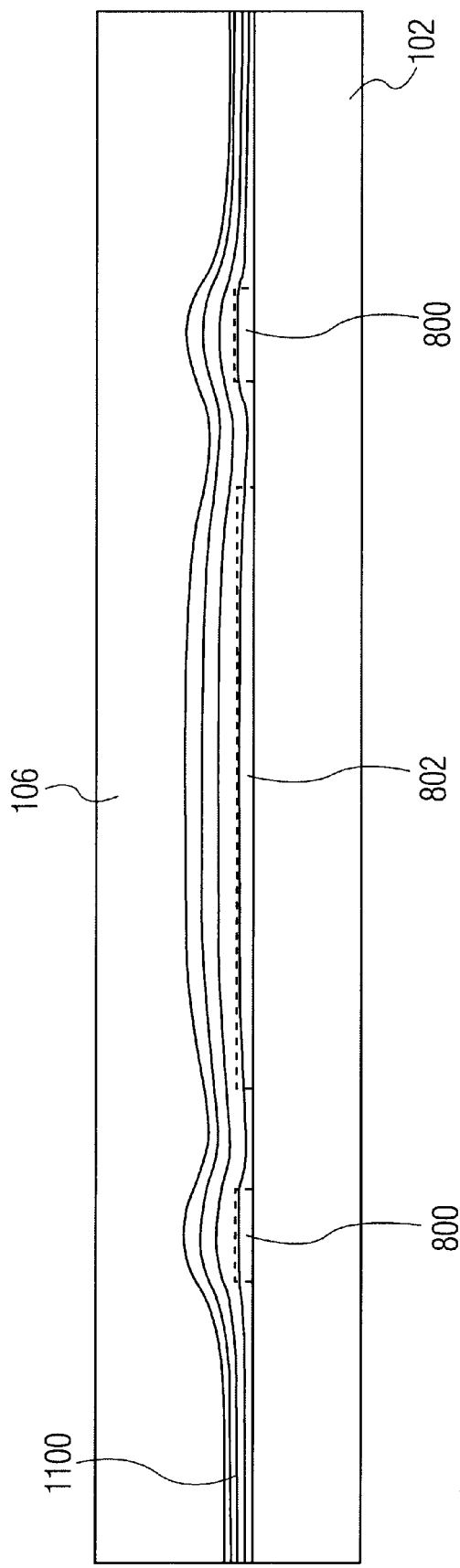

STABILIZING ELECTRO-ABSORPTION MODULATORS (EAM'S) PERFORMANCE BY MAINTAINING CONSTANT ABSORPTION WITH THE USE OF INTEGRATED TAP COUPLERS

CROSS-REFERENCE TO RELATED APPLICATIONS

This application claims the benefit of U.S. Provisional Application No. 60/314,789, filed Aug. 24, 2001 and U.S. Provisional Application No. 60/335,166, filed Nov. 1, 2001, the contents of which are incorporated herein by reference.

This invention relates to semiconductor optical devices with quantum well structures. More particularly this invention relates to the monolithic integration of optical taps with an electroabsorption modulator, or other active electro-optical component.

BACKGROUND OF THE INVENTION

Optical communication systems use pulses of light to transmit data. These optical communications systems use a number of components, such as lasers, the optical fibers, electroabsorption modulators (EAM's), semiconductor optical amplifiers (SOA's), and variable optical attenuators (VOA's), which encode signals in the pulses of light, transmit the pulses and detect the optical signals. Optical monitors are an important element of integrated optical component devices and systems. Optical monitors typically produce a current, or voltage, proportional to the optical energy incident on them. This electrical signal may be used to provide both performance monitoring and an input signal for performance optimization circuitry. Performance monitoring and performance optimization are desirable to ensure reliable operation of optical communication systems.

Desirably, an optical monitor should not produce large currents or use excessive amounts of electrical power, nor should the optical monitor create undue loss of the optical signal being monitored through scattering or absorption.

Currently in the telecommunications industry optical monitoring is accomplished using a fiber fused coupler that bleeds off about 5% of the optical signal and sends it to a separate optical detector. These couplers are larger and more expensive than may be desirable and also require fiber splicing in the system, which may lead to coupling losses. Additionally, some couplers, or other components, may be damaged during the delicate fiber splicing operations.

When deploying an optical transmitter into an optical communication network, it is also desirable to have algorithms that continually maintain and optimize the optical performance. One form of optical transmitter whose operation may be desirably improved by optical monitoring is an EAM. A valuable control algorithm for an EAM is to maintain a constant optical absorption across the modulator for the modulated signal. Maintaining a constant optical absorption across the modulator may ensure that the device is operating under the desired bias conditions. The ratio of this optical absorption to the transmitted signal is known as the extinction ratio of the modulator. Maintaining a constant extinction ratio may allow consistent optical performance, even with variations of wavelength and age-induced changes or environmentally-induced changes, such as temperature changes, in the performance of components of the optical communications system, including the EAM. Consistent optical performance for various input wavelengths may also be achieved.

SUMMARY OF THE INVENTION

One embodiment of the present invention is a monolithic stabilized electroabsorption modulator (EAM). An exemplary monolithic stabilized EAM includes: a substrate; a waveguide layer; a semiconductor layer. The waveguide layer is coupled to the top surface of the substrate and includes an electroabsorption medium, which interacts with light of the predetermined wavelength, and is responsive to an electric signal. The electric signal is applied between the substrate and the semiconductor layer. The waveguide layer includes an output optical tap section and a modulation section which is adjacent to the output optical tap section. These sections each include a portion of the electroabsorption medium. An output tap electrode and a modulator electrode may be coupled to the semiconductor layer opposite the output optical tap section and modulation section of the waveguide layer, respectively.

A further embodiment of the present invention is a method of manufacturing an exemplary monolithic stabilized EAM which includes a substrate; a waveguide layer with an output optical tap section and an electroabsorption section arranged along a longitudinal axis; and a semiconductor layer. The method begins with forming a waveguide layer on the top surface of the substrate. The waveguide layer has a different index of refraction than the substrate. The waveguide layer includes an electroabsorption portion which is adjacent to the output optical tap portion. The electroabsorption portion of the waveguide layer may also include a plurality of sub-layers of waveguide material forming a quantum well structure. Next, the semiconductor layer, which has an index of refraction different from the index of refraction of the waveguide, is formed on the waveguide layer. The waveguide layer and the semiconductor layer are then defined and etched to form a mesa structure. A base electrical contact is deposited on the substrate and a modulator electrical contact and output optical tap electrical contact are deposited on the semiconductor layer.

Still another embodiment of the present invention is a method of stabilizing the extinction ratio of a monolithic stabilized EAM, which includes an input optical tap, an EAM, and an output optical tap. The method begins by supplying a bias voltage to the input optical tap, the EAM, and the output optical tap. Next, the input tap current of the input optical tap and the output tap current of the output optical tap are detected. The extinction ratio of the EAM is then calculated based on these tap currents. The bias voltage is varied based on the calculated extinction ratio to control the extinction ratio at a predetermined level.

An additional embodiment of the present invention is a method of stabilizing the extinction ratio of a monolithic stabilized EAM, which includes an EAM and an output optical tap. The method begins by supplying an input optical signal to the monolithic stabilized EAM and supplying a bias voltage to the EAM and the output optical tap. A periodic variation in the input optical signal is generated, which has a variation amplitude and a variation frequency. Next the output tap current of the output optical tap is detected, using synchronous detection at the variation frequency. The extinction ratio of the EAM is then calculated based on the output tap current. The bias voltage is varied based on the calculated extinction ratio to control the extinction ratio at a predetermined level.

A still further embodiment of the present invention is a method of stabilizing the extinction ratio of a monolithic stabilized EAM, which includes a temperature control element, a temperature sensor, an EAM, and an output optical tap. The method begins by supplying a bias voltage to the EAM and the output optical tap and supplying a temperature control voltage to the temperature control element. The temperature of monolithic stabilized EAM is measured using the temperature sensor and the temperature control voltage is varied based on the measured temperature to regulate the temperature of monolithic stabilized EAM to an operating temperature. Next the optical tap current of the output optical tap is detected. The extinction ratio of the EAM is then calculated based on the output tap current. The operating temperature is varied based on the calculated extinction ratio to control the extinction ratio at a predetermined level. Additionally, the bias voltage may be varied based on the calculated extinction ratio to provide additional control of the extinction ratio at a predetermined level.

Another embodiment of the present invention is a tunable EAM system, which includes a monolithic stabilized EAM, a tap current monitor, extinction ratio calculation circuitry, a bias controller, and a temperature controller. The monolithic stabilized EAM includes a substrate a waveguide layer coupled to the substrate, a semiconductor layer coupled to the waveguide layer, a temperature control element coupled to the substrate, and a temperature sensor coupled to the substrate. The waveguide layer includes an output optical tap section which is defined by an output tap electrode and a modulation section which is defined by a modulation electrode. The tap current monitor is electrically coupled to the output tap electrode of the monolithic stabilized EAM to measure the tap current. The extinction ratio calculation circuitry is coupled to the tap current monitor and is adapted to determine a desired bias voltage of the optical tap section and the modulation section of the monolithic stabilized EAM and a desired operating temperature of the monolithic stabilized EAM based on the output tap current. The bias controller is coupled to the extinction ratio calculation circuitry and electrically coupled to the output tap electrode and the modulator electrode of the monolithic stabilized EAM to supply the bias voltage determined by the extinction ratio calculation circuitry to the output optical tap section and the modulation section of the monolithic stabilized EAM. The temperature controller is coupled to the extinction ratio calculation circuitry, as well as the temperature control element and the temperature sensor of the monolithic stabilized EAM to control the temperature of the monolithic stabilized EAM at the operating temperature determined by the extinction ratio calculation circuitry.

BRIEF DESCRIPTION OF THE FIGURES

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIG. 11B is a side cut-away drawing along the line 11B—11B of FIG. 11A of the exemplary monolithic transmissive expanded beam mode active optical device with electro-optical taps during manufacture shown in FIG. 11A.

DETAILED DESCRIPTION OF THE INVENTION

Figure 1A:
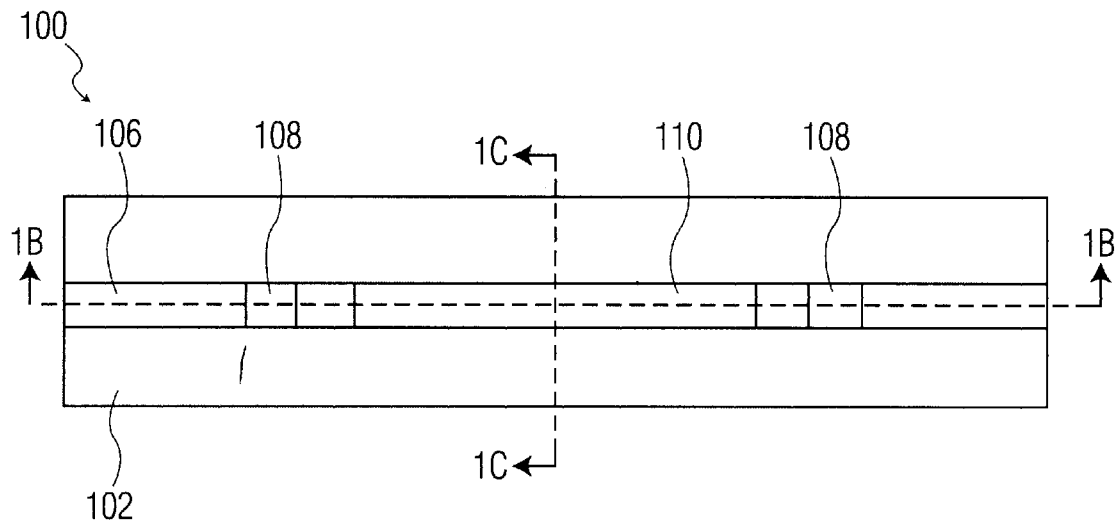
FIG. 1A is a top plan drawing of an exemplary monolithic transmissive active optical device with electro-optical taps according to the present invention.
Figure 1B:
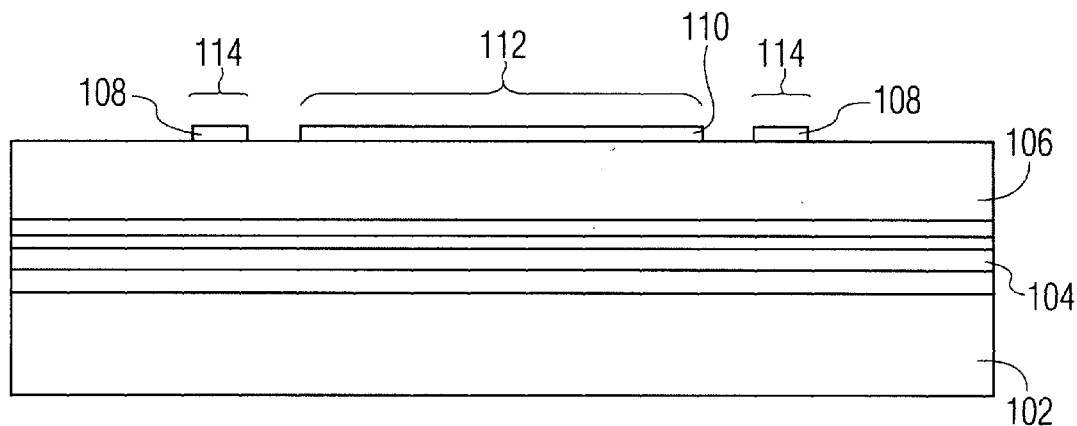
FIG. 1B is a side cut-away drawing along the line 1B—1B of FIG. 1A of the exemplary monolithic transmissive active optical device with electro-optical taps shown in FIG. 1A.
Figure 1C:
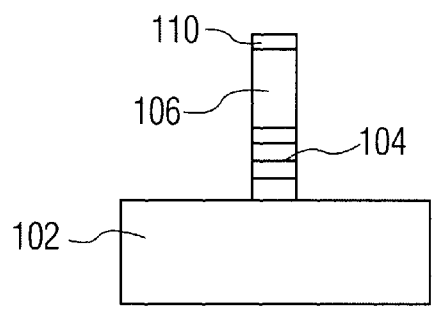
FIG. 1C is a front cut-away drawing along the line 1C—1C of FIG. 1A of the exemplary monolithic transmissive active optical device with electro-optical taps shown in FIGS. 1A and 1B.

One embodiment of the present invention is a monolithic transmissive active optical device, illustrated in FIGS. 1A–C, such as an electroabsorption modulator (EAM), a variable optical attenuator (VOA), or a semiconductor optical amplifier (SOA), with input and output optical taps. Another embodiment includes mode expansion/contraction (E/C) sections within the monolithic structure to improve optical coupling and/or improve tap performance, illustrated in FIGS. 12A–C. Further embodiments of the present invention incorporate temperature as well as bias control to improve performance of exemplary monolithic transmissive active optical devices. Additional embodiments include methods of manufacture, and exemplary uses of devices of this type.

Although the exemplary embodiments below are mostly described in term of monolithic stabilized EAM's, it is understood by one skilled in the art that additional exemplary embodiments incorporating VOA's or SOA's may be designed and used in the same manner. The design and operation of a VOA is very similar to an EAM. Both VOA's and EAM's involve electrically controllable optical absorption within a reverse biased P-N junction, or a P-I-N single or multiple quantum well junction. The main difference is that an EAM uses a modulated voltage signal to rapidly shift the optical absorption between a minimum and a maximum value, thereby creating a modulated optical signal, and a VOA is desirably set to an intermediate absorption level using a DC bias. An SOA may also be formed similarly to an EAM or VOA, but with the junction forward biased to induce optical gain in the active material, rather than reverse biased to induce optical absorption. U.S. patent application Ser. No. 10/056,929 to A. Bond is incorporated by reference for its teaching on the design and operation of EAM's.

An exemplary method of EAM operation involves setting a DC reverse bias on the junction so the center of the absorption curve of the device coincides with the desired wavelength to be modulated. An RF modulation signal may then be applied to modulate the absorption along the absorption curve.

The ratio between the minimum and the maximum absorption, the extinction ratio, of an EAM is desirably maximized. At the same time, it is desirable to use a modulation signal that has an amplitude which is as small as possible. Therefore, a steep slope for the absorption spectrum of an EAM is desirable. In contrast, it may be desirable for a VOA to have an absorption spectrum with a shallower slope to improve the attenuation sensitivity.

The absorption spectrum of an EAM, or a VOA, may be affected by a number of factors. Some factors are part of the design of the device such as choice of material, and quantum well thickness, but other factors such as DC bias voltage and operating temperature may be varied during operation. The slope of the absorption spectrum near the cutoff wavelength may be manipulated by proper selection of the bias voltage and operating temperature. These parameters may also allow the center wavelength of the absorption curve to be tuned. A tuning range of ~100 nm (e.g. 1525–1620 nm) with a temperature variation ~75° C. (e.g. 10–85° C.) may be achieved in a multiple quantum well EAM constructed of III/V materials such as InP, GaAs, or InGaAsP.

EAM's, and other components of an optical communications system, may create a chromatic dispersion, or chirp, in the optical signal. This chromatic dispersion may lead to undesirable effects, such as broadening of the pulses making up the optical signal or decreasing the S/N of the optical signal. Optical communication systems, therefore, often include components to compensate for this dispersion. These dispersion compensation components may be static, set to compensate for specific amounts of chirp, and may be difficult to tune. A stabilized EAM, or other active optical component, may desirably maintain a constant chirp to simplify dispersion compensation within the optical system.

Another operational issue with using EAM's may be the possibility of performance variations with changes in wavelength. As the input wavelength changes, the output extinction ratio and chirp of the device are not constant. As described above, this variation in the performance of an exemplary EAM may be compensated by adjustments to the bias voltage and/or the operating temperature of the device. It may, therefore, be possible to maintain consistent performance as the wavelength of the optical signal changes through a range of, for example, 100 nm.

The wavelength of the optical signal may change over time due to environmental factors in the optical communication system or aging of the other active optical components in the system such as lasers. The ability of an exemplary tunable EAM system, such as the embodiment described below with regard to FIG. 13, to track these changes and compensate for them may desirably lessen the amount environmental control necessary for components of an exemplary optical communications system and may also desirably extend the usable lifetime, or relax the tolerances, of these components. Additionally, the characteristics of the EAM itself may change over time or may be adversely affected by environmental changes, but an exemplary tunable EAM system may be able to compensate for these changes as well.

In order to stabilize EAM performance, it is desirable to monitor the output optical power of the EAM. It may also be desirable to monitor the input optical power as well. Optical monitoring of an EAM's performance may also be desirable to allow dynamic tuning in an optical system to track any wavelength changes that may occur.

FIGS. 1A–C illustrate an exemplary embodiment of a monolithic stabilized EAM 100, including output, and input, optical taps, 114. FIG. 1A is a top plan view of the exemplary monolithic stabilized EAM 100. Cut line 1B—1B shows the orientation of the side cut-away view of monolithic stabilized EAM 100 shown in FIG. 1B and cut line 1C—1C shows the orientation of the front cut-away view of monolithic stabilized EAM 100 shown in FIG. 1C.

Currently in the telecommunications industry, optical monitoring is accomplished using a fiber-fused coupler that bleeds off about 5% of the optical signal and sends it to an optical detector. These couplers are large and somewhat expensive in comparison to an integrated optical tap and also require fiber splicing in the system, which may lead to coupling losses. Desirably, only a minimal amount of optical signal is lost monitoring the signal.

One exemplary method of the present invention for creating an exemplary optical monitor, known as an optical tap, is to use a material in the light path that absorbs optical power at the wavelengths of interest and produces a measurable signal proportional to that power. The optical tap produces a signal as it absorbs optical energy. The principle of operation is the same as a VOA (or an EAM). The length the optical tap is desirably sufficient to provide a measurable signal. An exemplary optical tap may preferably be formed as a very short VOA, or EAM, to avoid significant optical absorption and may typically be a tenth or less of the length of the EAM being monitored. It is contemplated that an optical tap (or a pair of optical taps) may be used to monitor an EAM, a VOA, an SOA, a monolithic VOA/SOA combination, or any combination VOA's, SOA's, and EAM's. The optical tap may be desirably placed in the optical path after and/or before the device being monitored. The optical taps may be coupled to control circuitry that adjusts the operation of the VOA's, SOA's, and/or EAM's as appropriate to achieve a desired optical signal output. An exemplary AC detection method described below with reference to FIG. 14 may provide an increased S/N, allowing even shorter optical taps.

Preferably, an exemplary optical monitor, such as optical taps 114, may be formed of the same material as EAM 112, with the same band-gap or quantum structure. An exemplary optical tap may also be formed as part of the same waveguide structure as the EAM to be monitored in a monolithic structure, as shown in FIGS. 1A–C. Because the optical tap and the EAM are part of the same waveguide, there are no coupling loses. Also, since optical taps 114 and EAM 112 are formed with the same quantum well structure and operated under the same environmental conditions in this exemplary embodiment, the optical taps may have very similar wavelength and temperature characteristics to the EAM. Slow electrical detection may be used to average high-speed optical modulation of the signal and/or electrical cross talk from modulation of the EAM.

The exemplary monolithic stabilized EAM 100, shown in FIGS. 1A–C, is formed with three layers: substrate layer 102; waveguide layer 104; and semiconductor layer 106. Waveguide layer 104 may contain a number of sub-layers, as shown. These sub-layers form a quantum well structure within the waveguide layer. This structure may include a single quantum well, multiple quantum wells, separate confinement layers or a bulk active material. If a quantum well structure is employed, the quantum well structure is desirably designed to maximize the on/off ratio, the normalized height of the biased absorption peak, at the working wavelength of the EAM. The on/off ratio of a strained quantum well structure may be designed to be greater than the on/off ratio of a similar, but unstrained, exemplary quantum well structure. Therefore, it may be desirable to form a strained quantum well structure in waveguide 104.

Substrate layer 102 and semiconductor layer 106 may also include a plurality of sub-layers. Additionally, semiconductor layer 106 may desirably function as a cladding layer as well as the p-type material of the P-I-N quantum well structure.

Three electrical contacts are disposed on top of semiconductor layer 106. Modulator electrode 110 defines modulator portion 112 of monolithic stabilized EAM 100. Tap electrodes 108 define tap portions 114 of monolithic stabilized EAM 100. FIGS. 1A–C illustrate an exemplary monolithic stabilized EAM which includes both an input optical tap and an output optical tap. Alternatively, an exemplary monolithic stabilized EAM may be formed with only one optical tap (e.g. an output tap).

Figure 2:
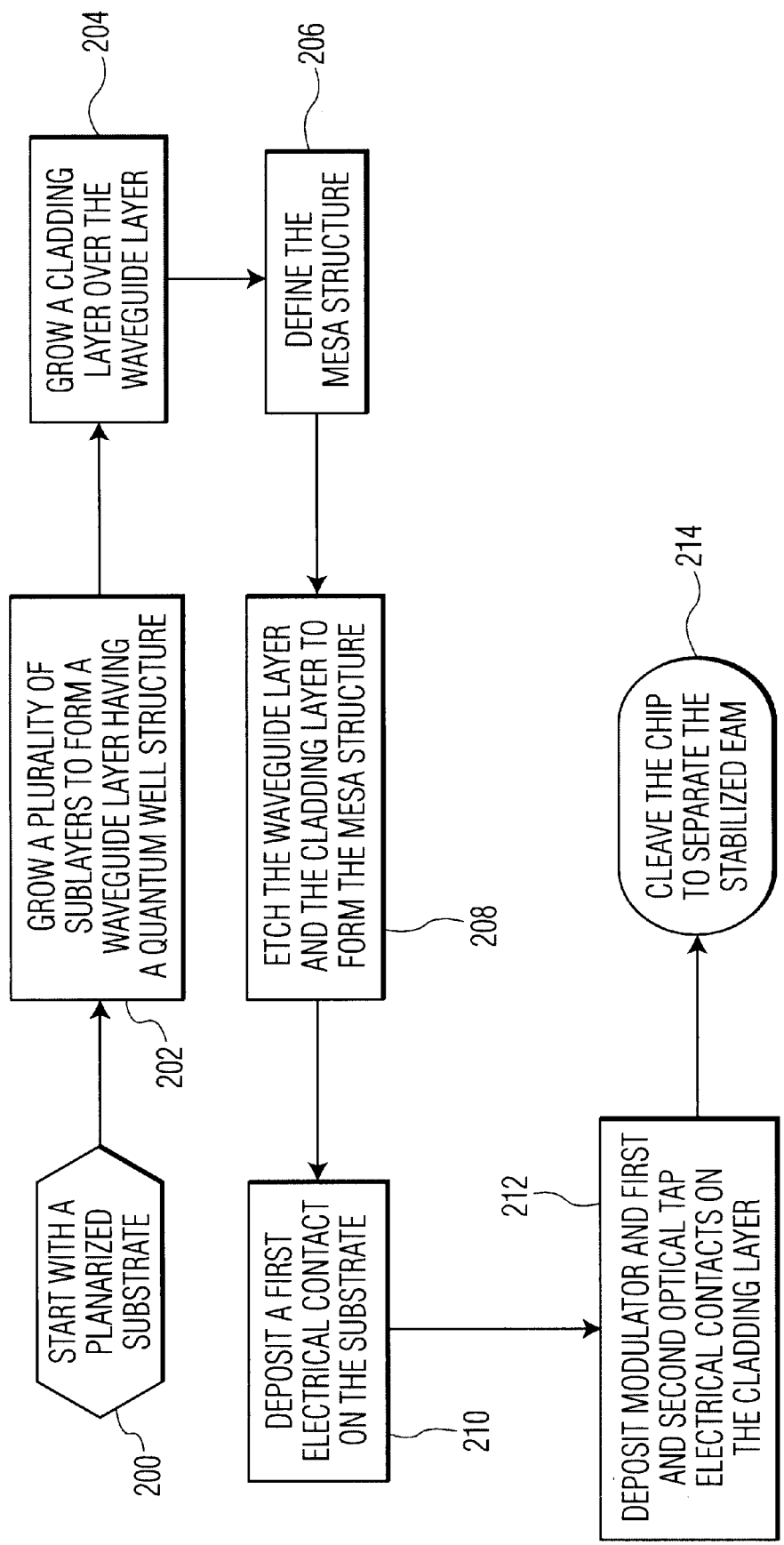
FIG. 2 is a flowchart illustrating an exemplary method of manufacture of the monolithic transmissive active optical device of FIGS. 1A–1C.

FIG. 2 is a flowchart describing an exemplary method of manufacture for producing exemplary monolithic stabilized EAM 100 from FIG. 1A–C. FIGS. 3A–C, 4A–C, 5A–C, and 6A–C illustrate various steps of this exemplary fabrication process.

The process begins with a substrate, step 200. Substrate 102, shown in FIGS. 3A–C, may function as both a cladding layer to assist in containment of the beam in the device and as the N layer of the P-I-N quantum well structure. (Although this description assumes that the substrate is the N side of the P-I-N structure, one skilled in the art will understand that the substrate could be the P side with the semiconductor layer 106 formed of N-type material instead.) The substrate is preferably formed of a III/V semiconductor, such as InP, GaAs, or InGaAsP. The substrate may also be formed of multiple layers such as GaAs grown on silicon or alumina.

Figure 3A:
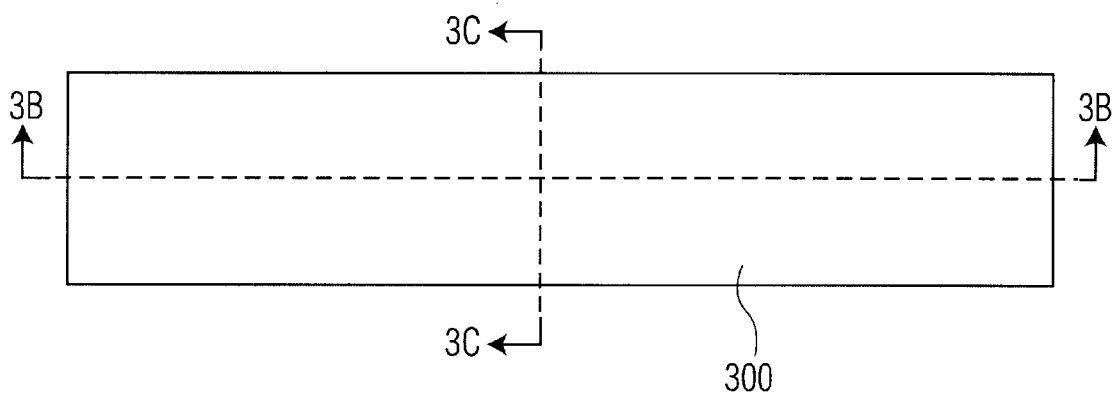
FIGS. 3A, 4A, 5A, and 6A are top plan drawings of an exemplary active optical device with electro-optical taps during manufacture according to the flowchart of FIG. 2.
Figure 3B:
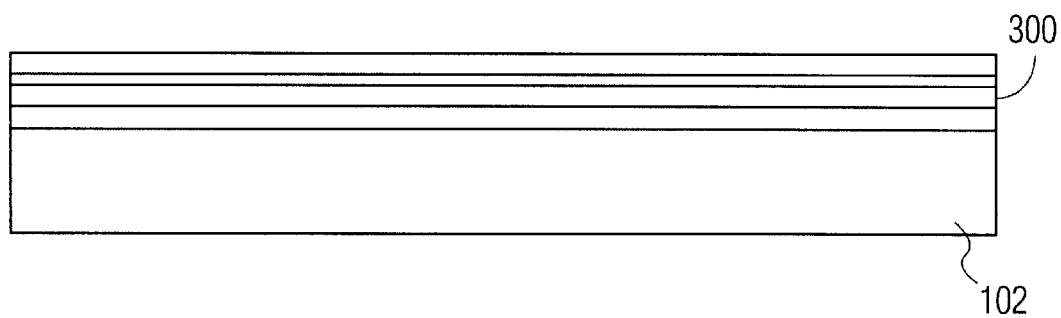
FIG. 3B is a side cut-away drawing along the line 3B—3B of FIG. 3A of the exemplary monolithic transmissive active optical device with electro-optical taps during manufacture shown in FIG. 3A.
Figure 3C:
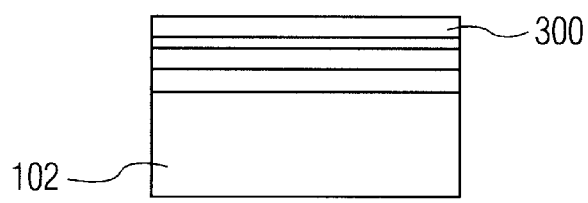
FIG. 3C is a front cut-away drawing along the line 3C—3C of FIG. 3A of the exemplary monolithic transmissive active optical device with electro-optical taps during manufacture shown in FIGS. 3A and 3B.

Next a plurality of sub-layers making up the waveguide layer are grown, step 202. Metal organic chemical vapor deposition (MOCVD) is one exemplary method that may be used for deposition of the sub-layers 300, but other epitaxial deposition techniques may also be employed, such as molecular beam epitaxy (MBE) and chemical beam epitaxy (CBE). The quantum wells and barriers may be composed of $In_xGa_{(1-x)}As_yP_{(1-y)}$ materials, as well as $In_xAl_yGa_{(1-x)}As_{(1-y)}$ and $In_xGa_{(1-x)}As$ materials. Specific selections of x and y depend on the desired bandgap and strain, if any, desired. These sub-layers may also be formed by other permutations of alloys formed from these elements. The quantum wells and barriers desirably have a sufficiently larger refractive index than the substrate 102 so that the quantum wells and barriers may act as a waveguide. FIGS. 3A–C illustrate an exemplary monolithic stabilized EAM at this stage of manufacture.

Figure 4A:
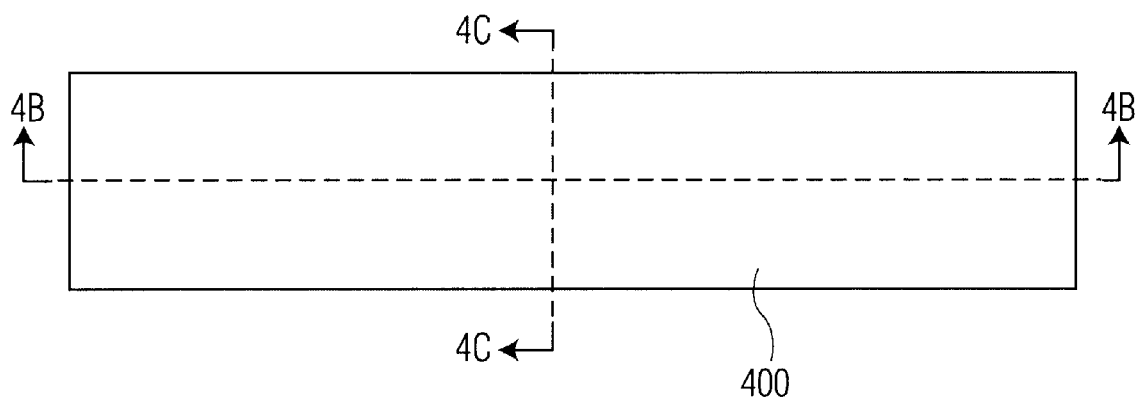
Figure 4B:
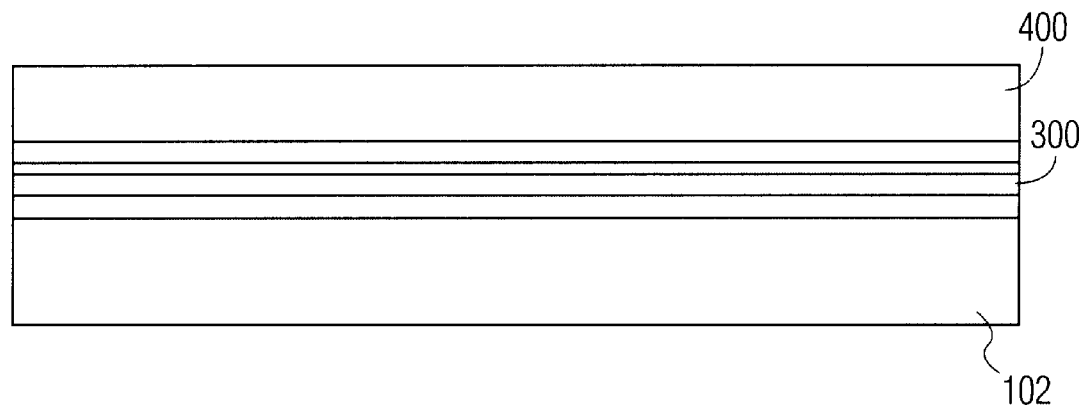
FIG. 4B is a side cut-away drawing along the line 4B—4B of FIG. 4A of the exemplary monolithic transmissive active optical device with electro-optical taps during manufacture shown in FIG. 4A.
Figure 4C:
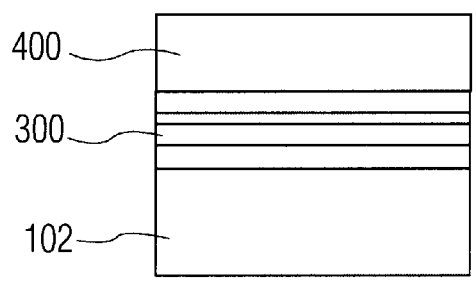
FIG. 4C is a front cut-away drawing along the line 4C—4C of FIG. 4A of the exemplary monolithic transmissive active optical device with electro-optical taps during manufacture shown in FIGS. 4A and 4B.
Figure 5A:
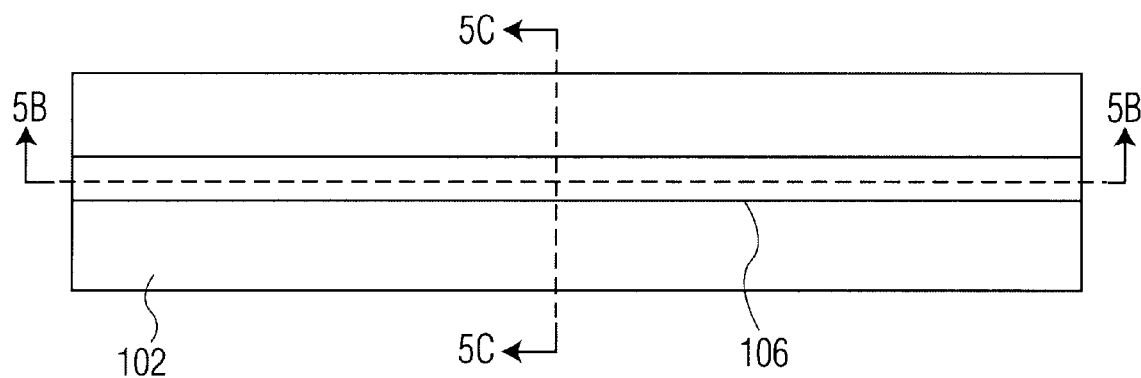
Figure 5B:
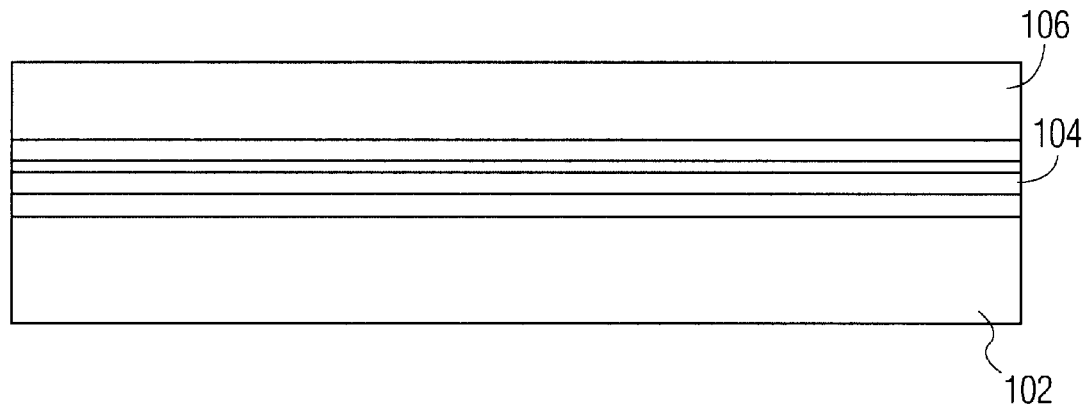
FIG. 5B is a side cut-away drawing along the line 5B—5B of FIG. 5A of the exemplary monolithic transmissive active optical device with electro-optical taps during manufacture shown in FIG. 5A.
Figure 5C:
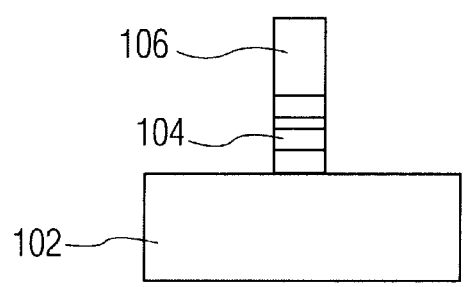
FIG. 5C is a front cut-away drawing along the line 5C—5C of FIG. 5A of the exemplary monolithic transmissive active optical device with electro-optical taps during manufacture shown in FIGS. 5A and 5B.

Next a cladding layer 400 is formed over the waveguide layer, step 204. This step of the fabrication process is illustrated in FIGS. 4A–C. Preferably, cladding layer 400 is formed using the same method as the waveguide layer. The cladding layer desirably has a refractive index lower than waveguide layer 300, preferably similar to that of substrate 102, to ensure light containment. Additionally, the cladding layer may be formed of a P type material, for example, P-type InP or GaAs. Also, cladding layer 400 may be formed in multiple sub-layers.

Step 206 defines the mesa structure of the monolithic stabilized EAM, for example, by selectively forming photoresist over a central portion of the structure shown in FIGS. 4A–C. The mesa includes the EAM section and two optical tap sections of the waveguide and cladding layers. This mesa may be straight, as shown in FIGS. 1A and 1C, or laterally tapered to enhance mode coupling into the fiber. Next these layers are etched to form the mesa structure, step 208. Steps 206 and 208 may be performed using standard wet or dry etch techniques. Although steps 206 and 208 are shown following step 204 in FIG. 2, it is contemplated that steps 206 and 208 could alternatively take place between steps 202 and 204. In this case cladding layer 106 would be grown to encase waveguide layer 104 on three sides.

Figure 6A:
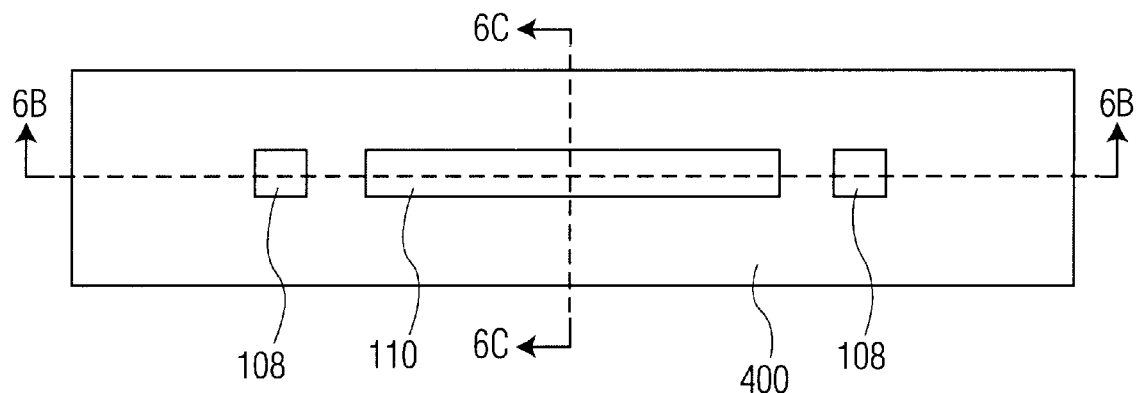
Figure 6B:
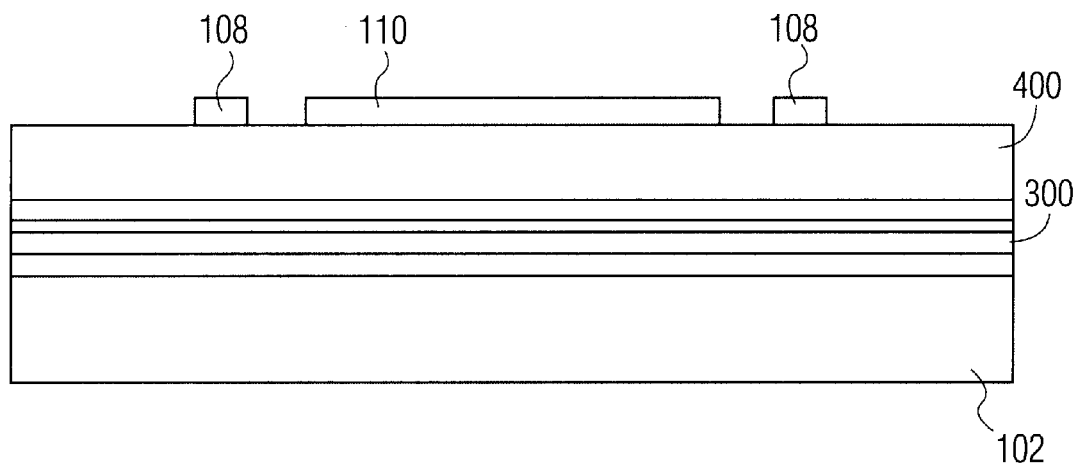
FIG. 6B is a side cut-away drawing along the line 6B—6B of FIG. 6A of the exemplary monolithic transmissive active optical device with electro-optical taps during manufacture shown in FIG. 6A.
Figure 6C:
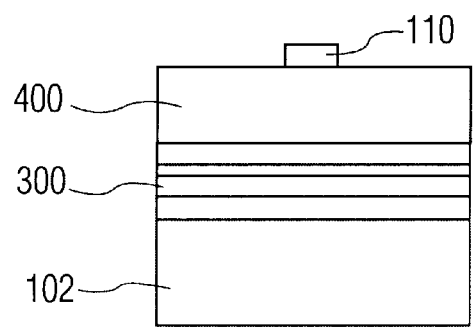
FIG. 6C is a front cut-away drawing along the line 6C—6C of FIG. 6A of the exemplary monolithic transmissive active optical device with electro-optical taps during manufacture shown in FIGS. 6A and 6B.

Once the mesa is formed, at least one n-type ohmic contact is deposited on the substrate layer, step 210. Three p-type ohmic contacts are deposited on the cladding layer to form modulator electrical contact 110 and optical tap electrical contacts 108, step 212 as shown in FIGS. 1A–C. Alternatively, steps 210 and 212 could take place before the mesa is formed, steps 206 and 208, as shown in FIGS. 6A–C. The device may be cleaved, step 214, to form exemplary monolithic stabilized EAM 100 illustrated in FIGS. 1A–C. Steps 210, 212, and 214 may be carried out by any of a number of standard semiconductor fabrication techniques known to those skilled in the art.

Desirably, an optical modulator waveguide has a large optical mode on its input side for optical coupling with minimal transmissive and reflective losses, followed by a tightly confining modulation region to achieve good modulation efficiency, and ending with a large optical output mode to couple to the output fiber with low transmissive and reflective losses. The modal properties of optical waveguides are a function of waveguide thickness. It can be shown that when an optical waveguide becomes thinner, the modal confinement in the waveguide decreases. This property may be used in conjunctions with exemplary optical taps to provide another embodiment of the present invention, a monolithic stabilized expanded beam mode EAM, which includes mode expansion/contraction (E/C) input and output sections, two optical tap sections, and a modulation section formed in a single piece by selective area growth. A further embodiment, shown in FIGS. 12A and 12B, also includes E/C sections in an expanded beam mode waveguide 1100 between optical taps 1002 and EAM 1000. These additional E/C sections may provide more precise definition of the optical tap and modulator portions of waveguide 1100 and may reduce electrical crosstalk between the optical taps and the EAM. It is noted that an exemplary monolithic stabilized expanded beam mode EAM may be formed with two optical taps, as shown in FIGS. 12A and 12B or may be formed with only one, output, optical tap.

Figure 12A:
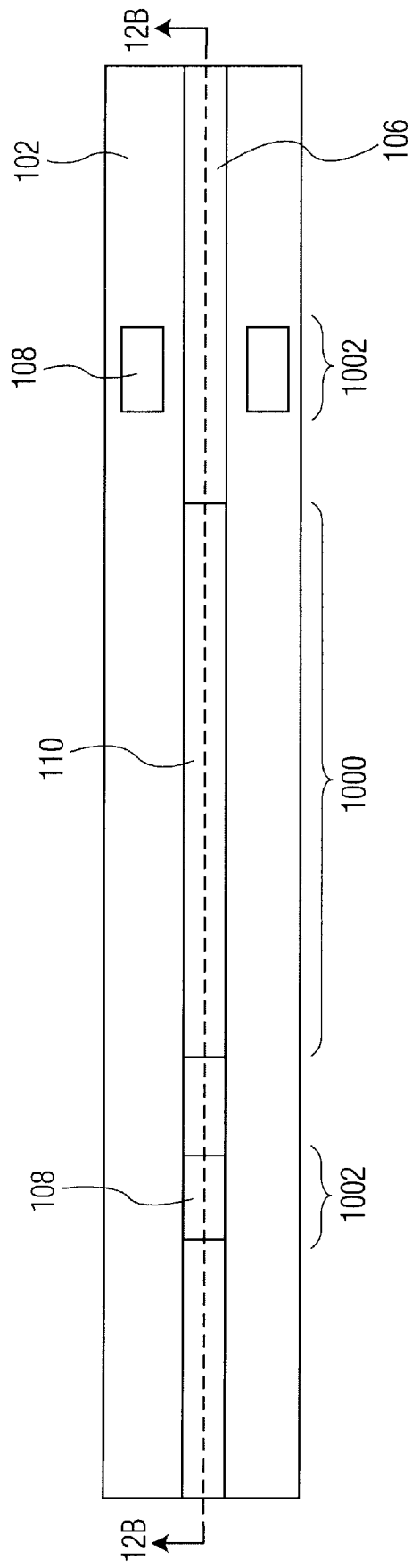
FIG. 12A is a side plan drawing of an alternative exemplary monolithic transmissive expanded beam mode device fabricated according the flowchart of FIG. 7.
Figure 12B:
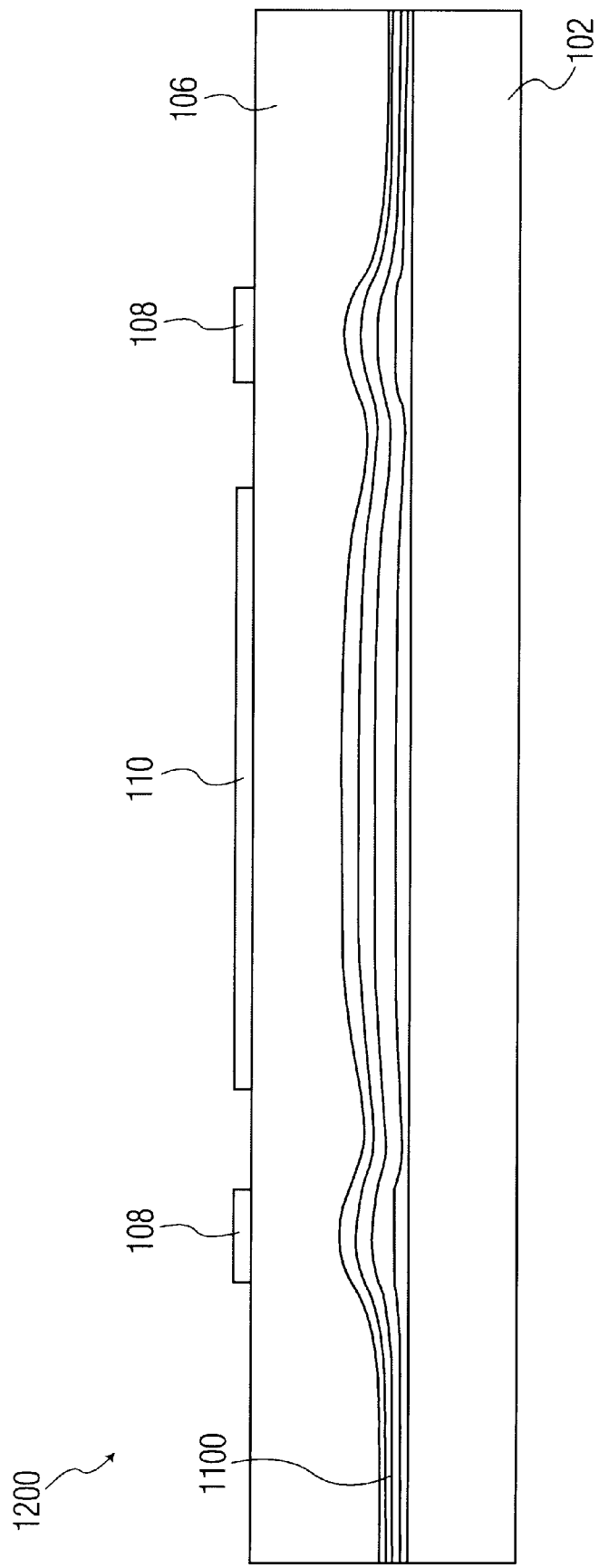
FIG. 12B is a front plan cut-away drawing along the line 12B—12B of FIG. 12A of the alternative exemplary monolithic transmissive expanded beam mode device shown in FIG. 12A.

FIGS. 12A and 12B illustrate an exemplary embodiment of the inventive modulator. FIG. 12A is a top plan view of the exemplary monolithic stabilized expanded beam mode EAM 1200. Cut line 12B—12B shows the orientation of the front cut-away view of EAM 1200 shown in FIG. 12B.

Exemplary monolithic stabilized expanded beam mode EAM 1200 is formed with three layers: substrate layer 102; waveguide layer 1100; and semiconductor layer 106. Waveguide layer 1100 may contain a number of sub-layers, as shown. These sub-layers form a quantum well structure within this layer. The waveguide layer 1110 may include a single quantum well, multiple quantum wells, separate confinement layers or a bulk active material. Substrate layer 106 and semiconductor layer 110 in FIGS. 12A and 12B are similar to the substrate and semiconductor layers described above with respect to FIGS. 1A–C.

A modulator may have a waveguide profile similar to that of waveguide layer 1100 in FIG. 12B. It is desirably thin at the input/output surfaces of the modulator chip and thicker in the optical tap sections 1002 and modulation section 1000. The quantum well structure in modulation section 1000 is designed to provide modulation at a predetermined working wavelength. Preferably optical tap sections 1002 have the same electro-optical properties as modulator section 1000.

An exemplary stabilized expanded beam mode EAM with a working wavelength of 1.55 □m, such as shown in FIGS. 12A and 12B, may have a band gap in modulation section 1000 which corresponds to an absorption peak of 1.51–1.53 □m. This band gap allows the device to efficiently absorb light when the off-voltage is applied and to pass light through with little absorption when biased at the on-voltage. There is generally some absorption of the working wavelength, when the device is biased at the on-voltage. This absorption amount is a tradeoff in designing the device.

It is possible to form an EAM that has a cutoff wavelength sufficiently short to eliminate substantially all absorption at the on-voltage bias. This may require an undesirably large voltage difference for modulation. It may be desirable, however, to form passive waveguides that have such a cutoff wavelength in the E/C sections. A property of quantum wells that may be exploited to assist with this issue is that, as the thickness of the quantum well increases, the band gap or energy of the absorption peak decreases. This corresponds to a significant decrease in the cutoff wavelength of light absorbed by the quantum well structure.

By using selective area growth it is possible to grow a single multi-layer quantum well structure having a varying thickness, and thus a varying cutoff wavelength. Therefore, the thickness of waveguide layer 1100 may be modified through the use of selective area growth, which is described below with reference to FIG. 7. This allows the band gap of the E/C sections in waveguide layer 1100 to be increased, by decreasing the thickness of the sub-layers. Increasing the band gap of the quantum wells in these sections effectively makes the quantum wells transparent to the working wavelength for both the on and the off-voltage. The use of selective, area growth techniques allows the thickness of E/C sections to vary from a minimum at input/output surfaces to a maximum at the thickness of optical tap sections 1002 and modulator sections 1000. The entire waveguide layer 1100 may be formed as a single unit, the sub-layers of the quantum well structure stretching continuously from one end of the device to the other. Using selective area growth techniques, E/C sections of 75 $\mu$m, or longer, may be formed, which have a continuously varying thickness. The thickness variation in the E/C sections may be desirably gentle enough to allow the beam modes to expand and contract adiabatically. This adiabatic expansion and contraction, coupled with the monolithic construction, diminishes the possibility of scattering losses within exemplary stabilized expanded beam mode EA modulator 1200.

The structure of both the quantum wells and the thickness profile may be closely controlled. Enhancements of 2.5 times in the thickness of along the length of waveguide 1100 may be achieved. The designed enhancement is desirably sufficient to maintain an absorption peak in the bulk of the mode E/C section far enough from the working wavelength to ensure substantial transparency, for example, 40 nm or more from the working wavelength.

For an exemplary 1.55 $\mu$m stabilized expanded beam EAM, modulation section 1000 may be designed with an on-voltage absorption peak of 1.52–1.53 $\mu$m and the E/C sections may be designed with an absorption peak of <1.51 $\mu$m substantially throughout. For an exemplary 1.32 $\mu$m stabilized expanded beam EAM, modulation section 1000 may be designed with an on-voltage absorption peak of 1.29–1.30 $\mu$m and the E/C sections may be designed with an absorption peak of <1.28 $\mu$m substantially throughout.

Figure 7:
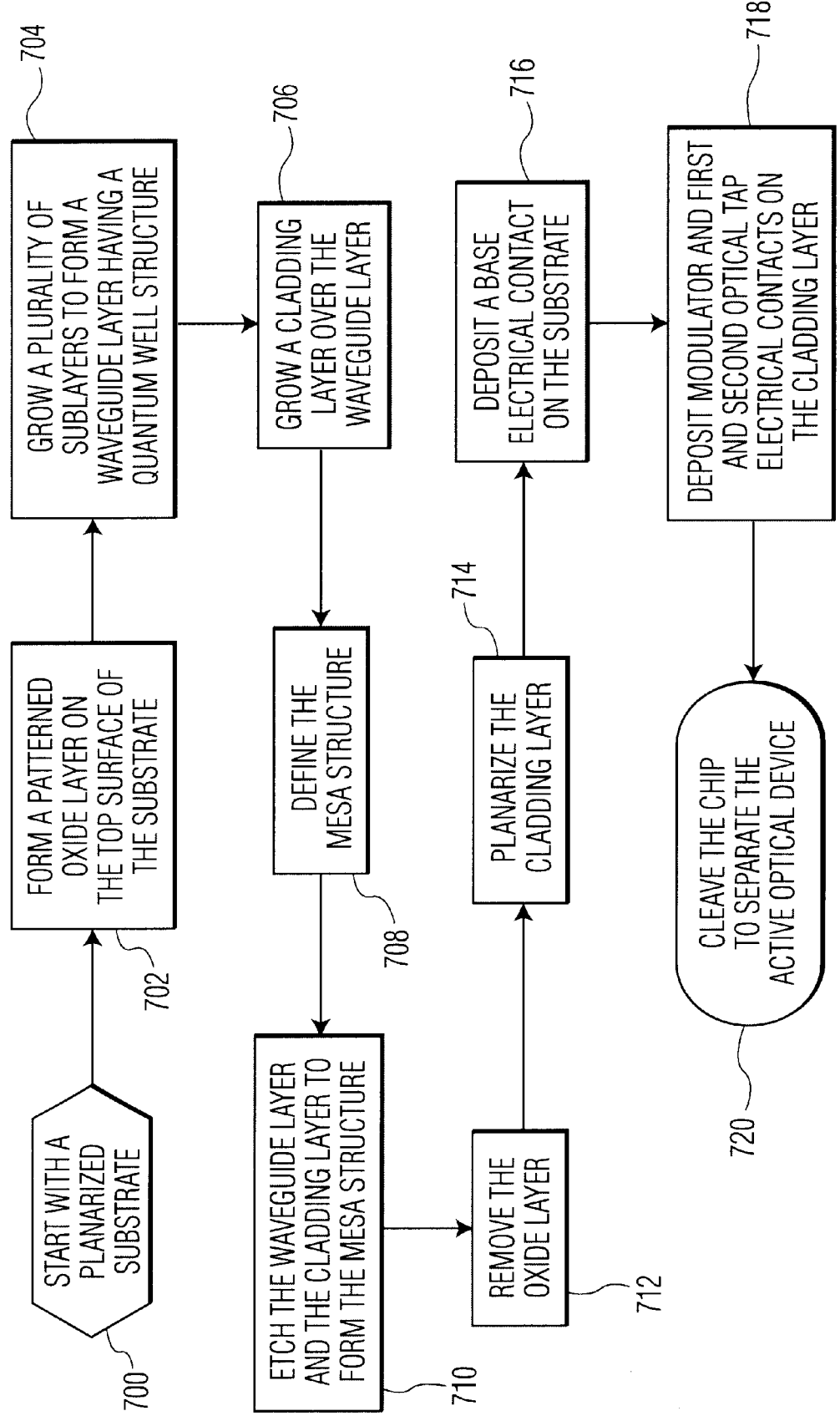
FIG. 7 is a flowchart illustrating an exemplary method of manufacture of an exemplary monolithic transmissive expanded beam mode active optical device with electro-optical taps according to the present invention.

FIG. 7 is a flowchart describing an exemplary selective area growth technique for producing exemplary stabilized expanded beam mode EAM 1200 from FIGS. 12A and 12B. FIGS. 8A, 8B, 9A, 9B, 10A, 10B, 11A, and 11B, illustrate various steps of this exemplary fabrication process.

The process begins with a substrate, step 700. Substrate 102, shown in FIG. 8, desirably performs the same functions and is formed in the same manner described above with respect to the exemplary method of FIG. 2.

Figure 8A:
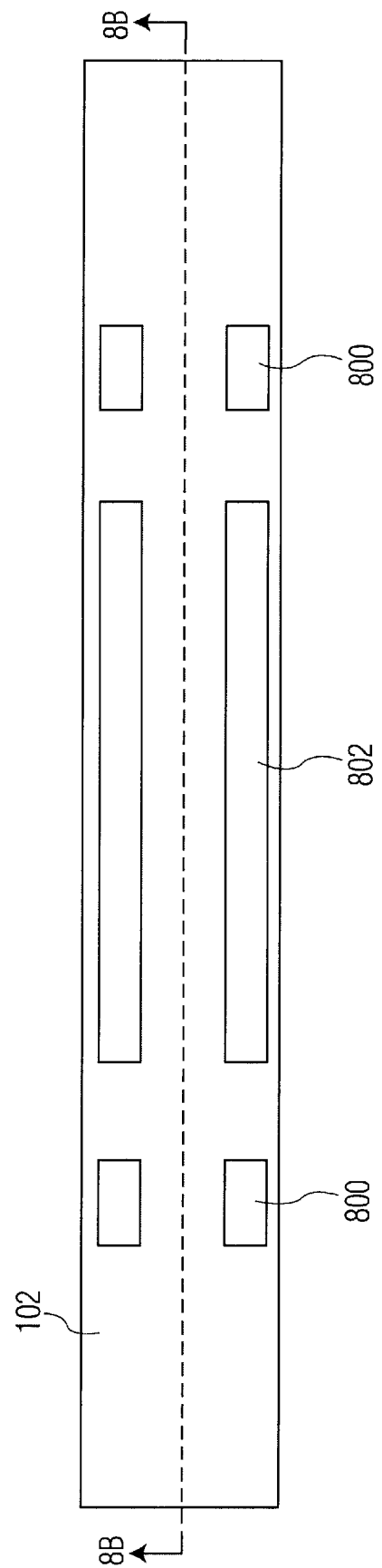
FIGS. 8A, 9A, 10A, and 11A are top plan drawings of an exemplary monolithic transmissive expanded beam mode active optical device with electro-optical taps during manufacture according to the flowchart of FIG. 7.
Figure 8B:
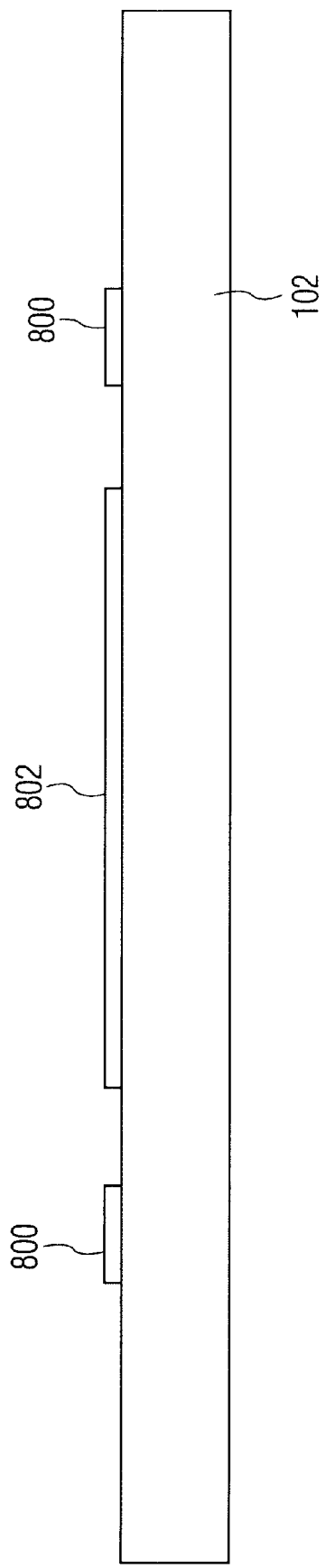
FIG. 8B is a side cut-away drawing along the line 8B—8B of FIG. 8A of the exemplary monolithic transmissive expanded beam mode active optical device with electro-optical taps during manufacture shown in FIG. 8A.

A patterned growth-retarding layer 800 and 802 is formed on the top surface of the substrate, step 702. Materials which retard growth of III/V materials, such as SiN or SiO2, desirably make up the growth-retarding layer. The growth-retarding layer may be formed and patterned using any standard techniques known in the semiconductor industry. FIGS. 8A and 8B show the wafer at this point in the fabrication process. The patterned growth-retarding layer is shown in FIG. 8A as two rectangular regions 802 separated by a channel disposed along longitudinal axis 8B—8B (also the cut line for the cutaway view in FIG. 8B) to define the EAM portion of the waveguide layer and four rectangular regions 800 to define the optical tap portions of the waveguide layer. For exemplary 2 μm wide optical taps and EAM, a 15 to 20 μm channel is desirable to provide substantial flatness of the layers in a transverse direction. Depending on the profile desired for the waveguide layer, other patterns, such as paired trapezoids or triangles, may be used. A larger number of regions may also be used.

Figure 9A:
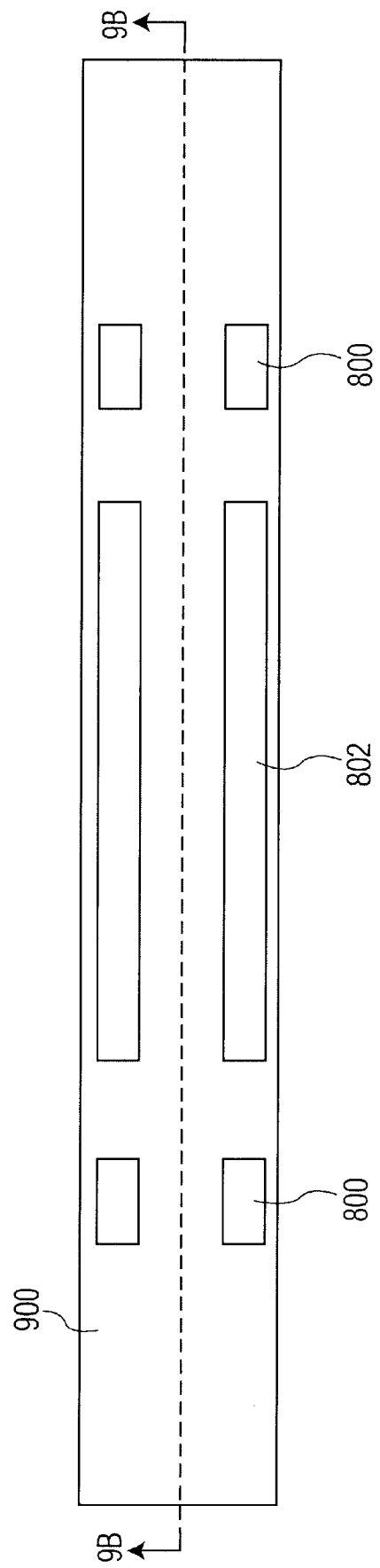
Figure 9B:
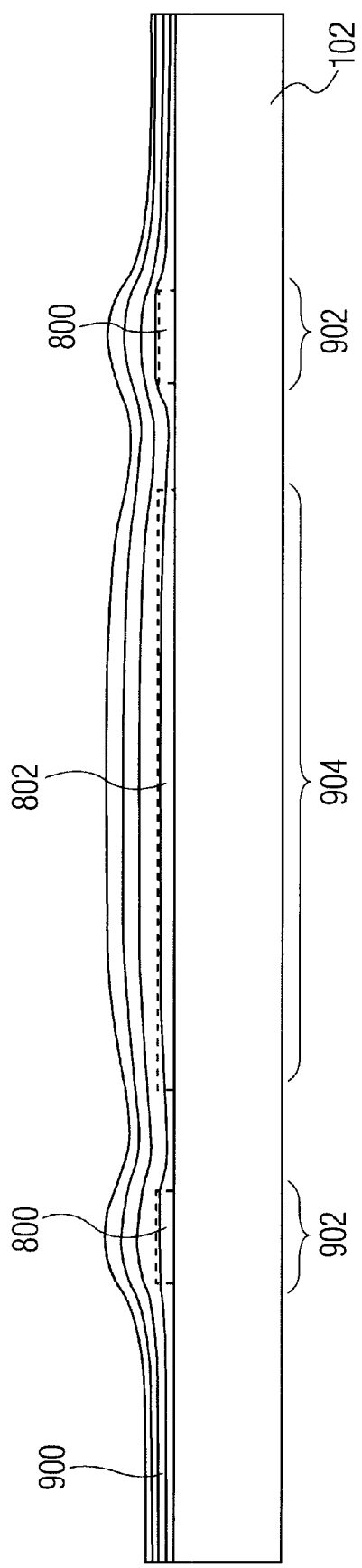
FIG. 9B is a side cut-away drawing along the line 9B—9B of FIG. 9A of the exemplary monolithic transmissive expanded beam mode active optical device with electro-optical taps during manufacture shown in FIG. 9A.

Next a plurality of sub-layers making up the waveguide layer are grown, step 704. Metal organic chemical vapor deposition (MOCVD) is one exemplary method that may be used for deposition of the waveguide sub-layers, but other epitaxial deposition techniques may also be employed, such as molecular beam epitaxy (MBE) and chemical beam epitaxy (CBE). Near the growth-retarding regions the growth rate is enhanced owing to gas phase diffusion and surface diffusion of the reactants in the MOCVD reactor away from growth-retarding regions 800 and 802. The quantum wells layers thus deposited 900, as shown in FIGS. 9A and 9B, are made thicker in the optical tap portions 902 and modulation portion 904 of the device owing to the growth-retarding masks.

The quantum wells and barriers are preferably composed of $In_xGa_{(1-x)}As_yP_{(1-y)}$ materials as well as $In_xAl_yGa_{(1-x)}As_{(1-y)}$ and $In_xGa_{(1-x)}As$ materials. Specific selections of x and y are dependent on the desired bandgap and strain, if any, desired. These sub-layers may also be formed by other permutations of alloys formed from these elements. The quantum wells and barriers desirably have a sufficiently larger refractive index than that of substrate 102 so that the quantum wells and barriers act as a waveguide.

Figure 10A:
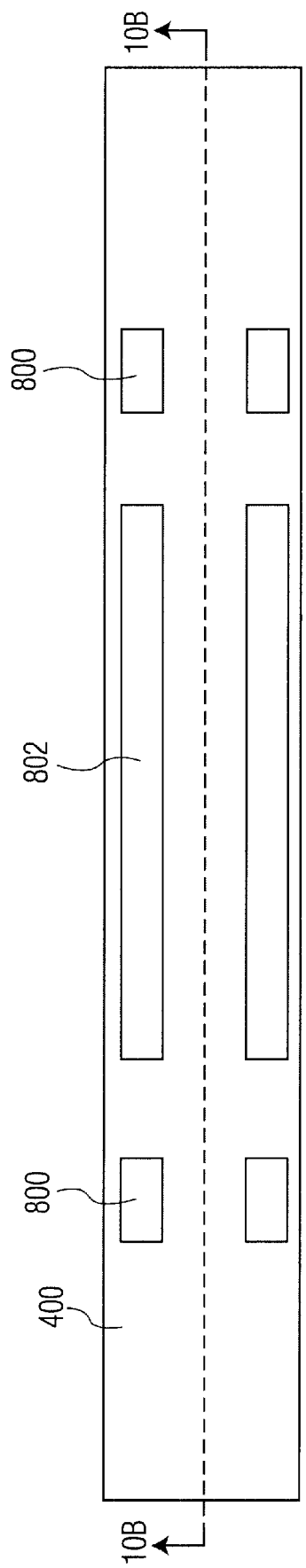
Figure 10B:
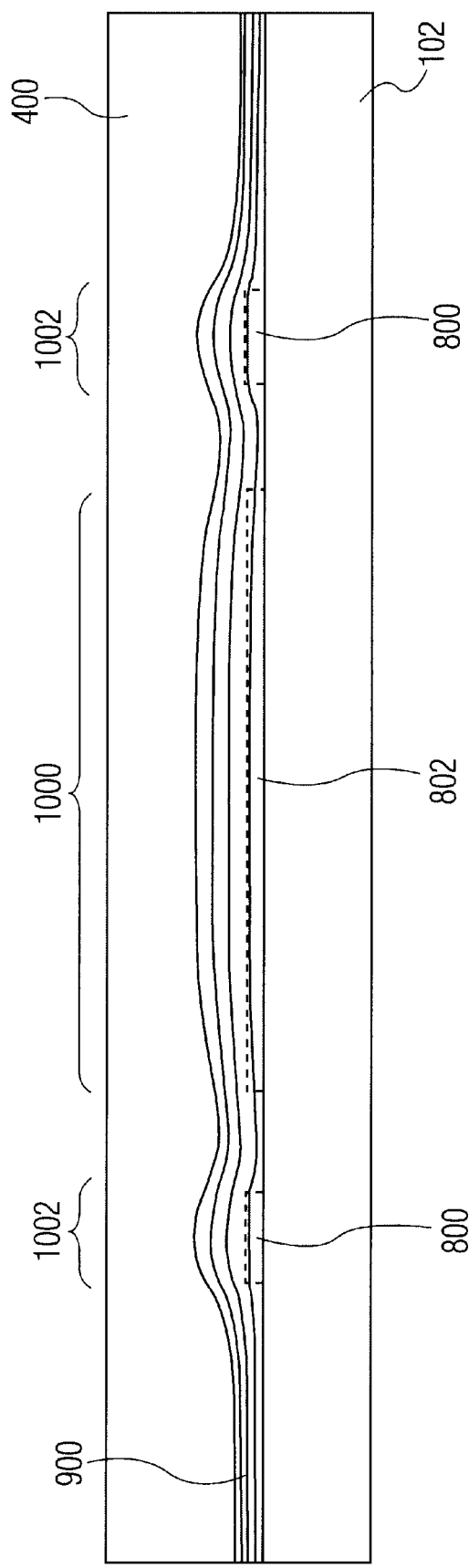
FIG. 10B is a side cut-away drawing along the line 10B—10B of FIG. 10A of the exemplary monolithic transmissive expanded beam mode active optical device with electro-optical taps during manufacture shown in FIG. 10A.
Figure 11A:
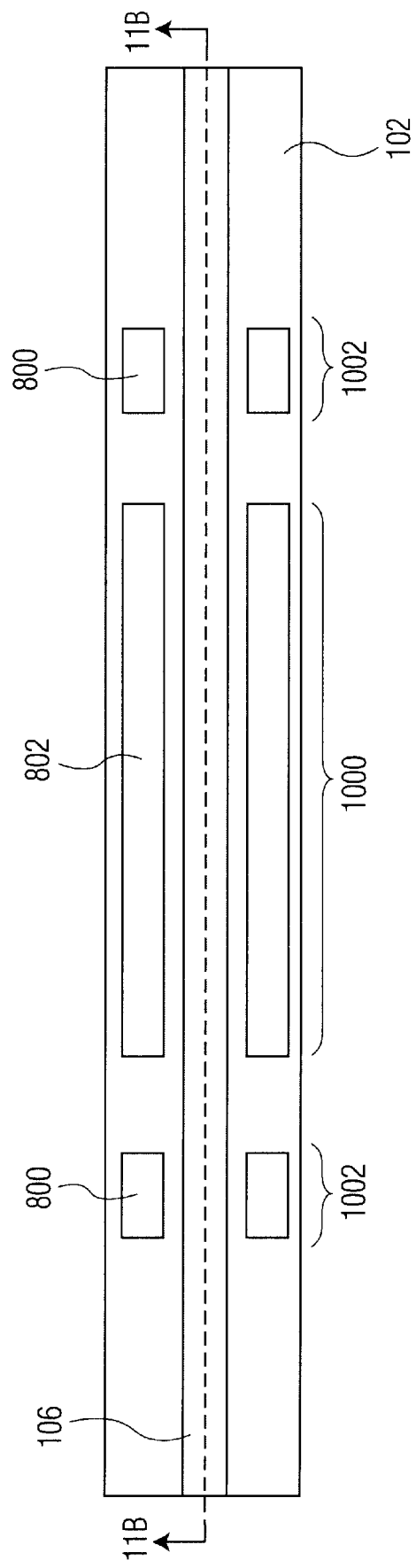

Next a cladding layer is formed over the waveguide layer, step 706. This step of the fabrication process is illustrated in FIGS. 10A and 10B. Preferably, cladding layer 400 is formed using an exemplary process described above with respect to step 204 of the exemplary method of FIG. 2. Likewise, step 708, defining the mesa structure, and step 710, etching the mesa structure of the stabilized expanded beam mode EAM, are desirably accomplished using exemplary processes described above with respect to steps 206 and 208 of the exemplary method of FIG. 2, respectively. FIGS. 11A and 11B illustrate this stage in the fabrication. Optical tap sections 1002 and modulator section 1000 of waveguide 1100 are shown.

Next growth-retarding layers 800 and 802 are removed, step 712. Although step 712 is shown following step 710 in FIG. 7, it is contemplated that step 712 could alternatively take place between steps 704 and 706 or after any of steps 714, 716, or 718. Additionally, step 712 could be skipped entirely if the growth-retarding layers do not interfere with the operation of exemplary stabilized expanded beam mode EAM 1200.

Once the mesa is formed, the cladding layer is planarized, step 714. At least one n-type ohmic contact is deposited on the substrate layer, step 716. Three p-type ohmic contacts are deposited on the exemplary cladding layer to form modulator electrical contact 110 and optical tap electrical contacts 108, step 718. The device may be cleaved, step 720, to form exemplary stabilized expanded beam mode EAM 1200 illustrated in FIGS. 12A and 12B. Steps 708, 710, 712, 714, 716, 718, and 720 may be carried out by any of a number of standard semiconductor fabrication techniques known to those skilled in the art.

Figure 13:
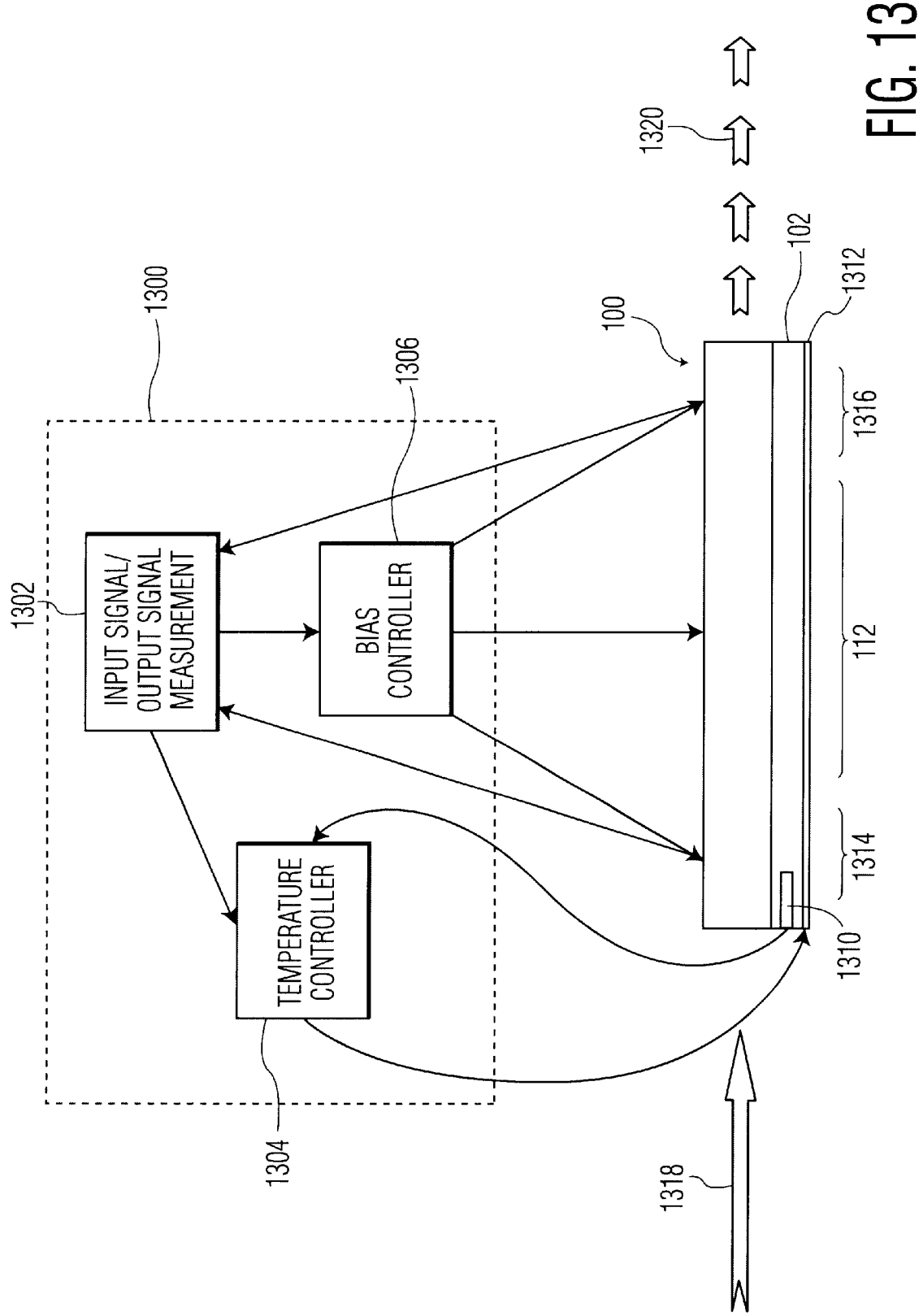
FIG. 13 is a block diagram illustrating an exemplary tunable EAM system.

FIG. 13 illustrates an exemplary tunable EAM system according to the present invention, incorporating an exemplary monolithic stabilized EAM of the present invention. The illustrated exemplary system includes monolithic stabilized EAM 100, described above with respect to FIGS. 1A–C, and EAM control electronics 1300. Although FIG. 13 and the description below use monolithic stabilized EAM 100, it is contemplated that an exemplary stabilized expanded beam mode EAM, such as stabilized expanded beam mode EAM 1300, described above with respect to FIGS. 12A and 12B, may be used instead. The monolithic stabilized EAM may also include temperature control element 1312 and temperature sensor 1310 coupled to substrate 102. Temperature control element 1312 may be a resistive heating element, a thermoelectric cooler, or both.

Bias controller 1306 and optical tap measurement and extinction ratio calculation circuitry 1302 are included in EAM control electronics 1300. Temperature controller 1304 may also be included in EAM control electronics 1300. EAM control electronics 1300, may be formed as a single unit or may be composed of separate elements.

Input optical signal 1318 enters monolithic stabilized EAM 100 and is modulated in modulator section 112 to form modulated optical signal 1320. Modulation is controlled by a coded RF modulation signal (not shown). Input optical tap 1314 monitors the input signal strength and output optical tap 1316 monitors the output signal strength.

DC bias voltages to the optical taps 1314 and 1316 and modulator section 112 are provided by bias controller 1306. The DC bias level is controlled by optical tap measurement and E/R calculation circuitry 1302, based on the current flowing through the optical taps.

Figure 14:
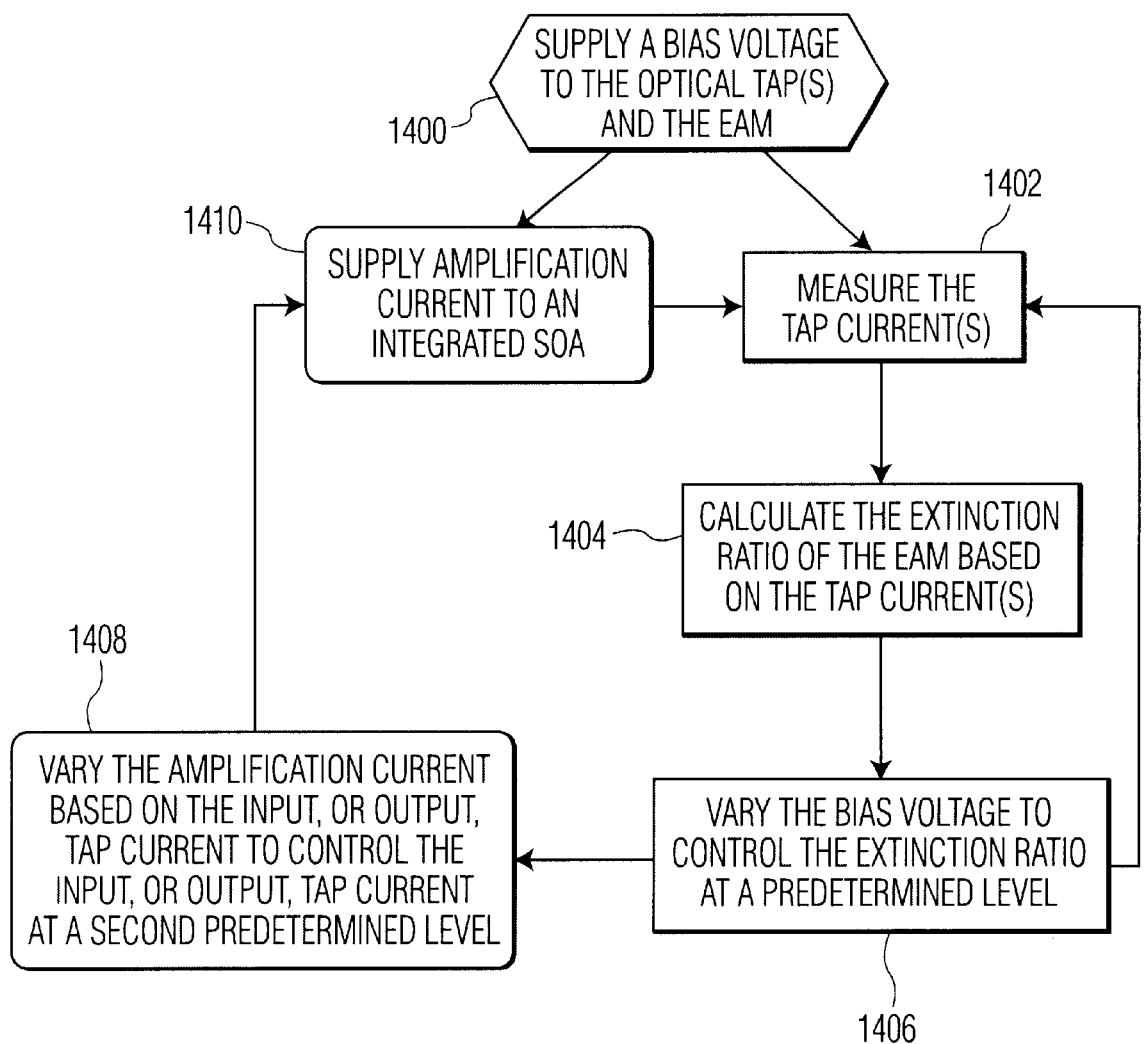
FIG. 14 is a flowchart illustrating an exemplary method of stabilizing the extinction ratio of an exemplary monolithic stabilized EAM with electro-optical taps according to the present invention.
Figure 15:
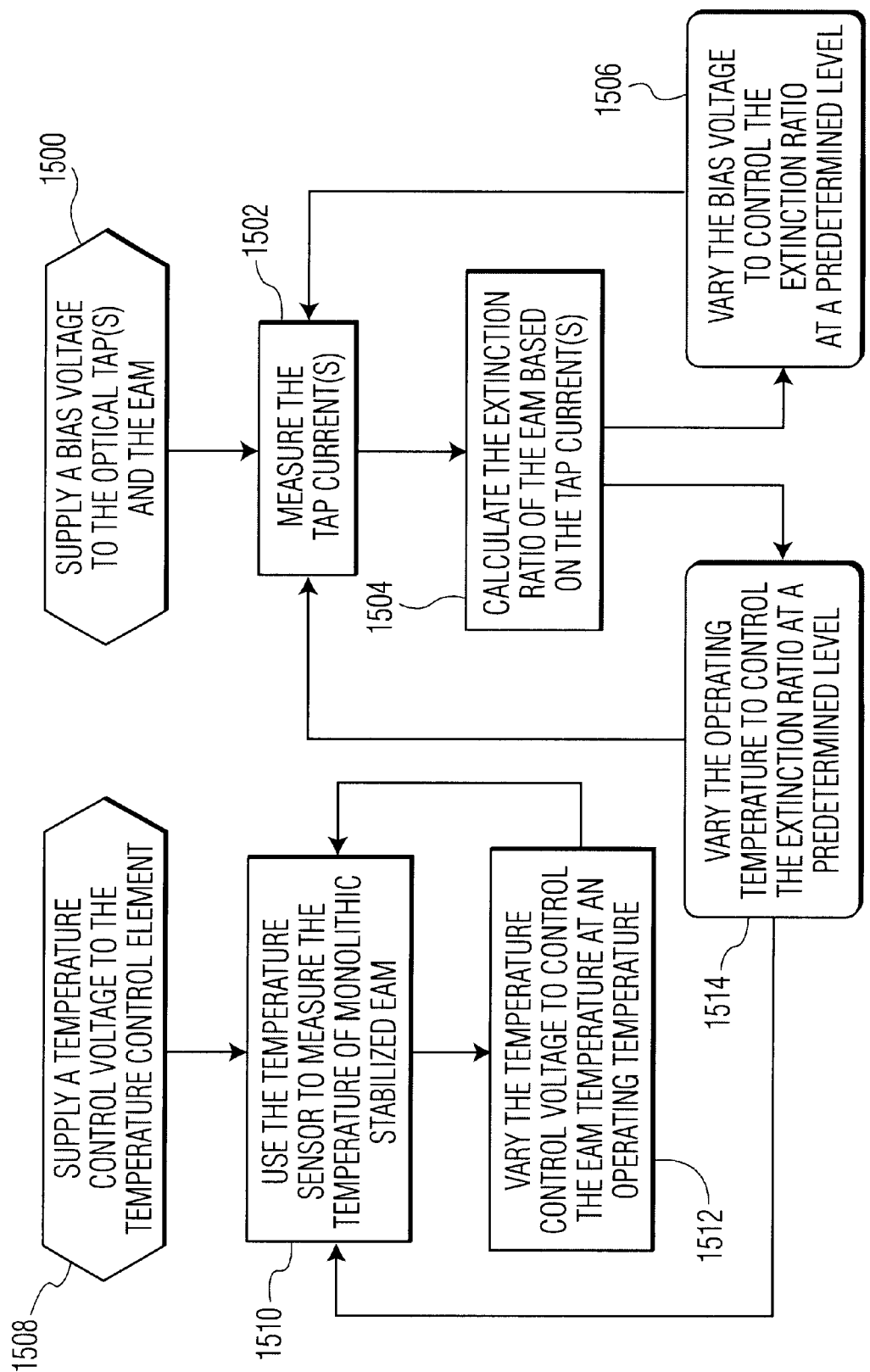
FIG. 15 is a flowchart illustrating an exemplary method of stabilizing the extinction ratio of an exemplary tunable EAM with electro-optical taps according to the present invention

FIGS. 14 and 15 illustrate exemplary methods of controlling an exemplary tunable EAM system, such as the system of FIG. 13, to provide stabilized EAM performance and to allowing dynamic tuning of the EAM system to track changes in the wavelength of input optical signal 1318.

The exemplary method of FIG. 14, begins by providing DC bias voltages to the optical taps 1314 and 1316 and modulator section 112 from bias controller 1306, step 1400. Alternatively, only one optical tap, output optical tap 1316 may be used, The bias voltage to all three sections of these sections is desirably the same, so that the electro-optical characteristics of the optical taps and the EAM may be substantially matched.

The next step is to measure the current flowing through the optical taps, step 1402. From the measured currents of the optical taps, a calculation is performed to determine the preferred bias current, step 1404. This calculation may, for example, determine the extinction ratio. The extinction ration may be found as a function bias voltage. The tap currents are recorded and the ratio of the output to input may be kept constant. It may be possible for the measurement and calculation of steps 1402 and 1404 to be performed by electrical division using comparison circuitry. Alternatively, these functions may be performed by programmed general-purpose signal processing circuitry, such as a digital signal processor. The DC bias level is then updated to control the extinction ratio at a predetermined level, step 1406. The process recycles through steps 1402, 1404, and 1406 to maintain performance of the stabilized EAM.

For simplicity of control, using electrical division, a desirable characteristic of an optical monitor is a linear behavior with no DC offset; i.e. the optical monitor should read zero when no signal is present. In addition to possible leakage current due to the DC bias of the optical taps, exemplary optical taps formed in a monolithic structure, for example the exemplary structure of FIGS. 1A–1C, may have DC leakage currents due to the imperfect electrical isolation between the optical taps and surrounding exemplary integrated components. These leakage currents may produce an offset in the optical tap current. Therefore, the optical tap current may not pass through zero at zero light intensity. This offset may complicate the use of comparison circuitry in optical tap measurement and E/R calculation circuitry 1302, where electrical division may be desirable, and may also reduces the effectiveness of the integrated optical tap by reducing its accuracy.

An exemplary method of over coming DC offset uses synchronous detection of a single optical tap, output optical tap 1316, to remove the DC component of the current from an optical tap. A tone, having a low frequency compared to the modulation signal, for example 2 kHz in an optical communication system, may be applied to laser driver current, or an SOA, VOA, EAM, or other active optical device preceding the optical detector, thereby inducing a relatively low frequency variation in the optical signal. The amplitude of this variation may be desirably small compared to the modulated optical signal amplitude, possibly on the order of 1% of the total signal. A relatively low-frequency analog variation of this type may be desirably easily detected via synchronous detection, yet not introduce appreciable noise in the high-frequency digital optical signal. Automatic gain control techniques may be used further reduce any possible effects from this low-frequency variation.

The current produced by the optical tap may be multiplied by an AC signal having the same frequency as the relatively low-frequency AC variation induced in the optical signal. Low-pass filtering for frequencies below twice the AC variation frequency may then provide a signal proportional to the amplitude of the optical tap current variation. Alternatively, the current produced by the optical tap from an optical signal with a relatively low-frequency AC variation may then be passed through a filter matched to the low frequency variation induced in the optical signal before measurement, or a lock-in detection method may used to isolate the low-frequency AC signal. The peak-to-peak value of the current at this relatively low-frequency signal is desirably directly proportional to the optical intensity passing through the optical tap. Having a signal that is directly proportional to the optical intensity, with no DC offset, allows comparison circuitry through electrical division to be employed determine the desired DC bias level.

Since large currents are not necessary with synchronous detection, in an alternative embodiment, the device may be slightly forward biased, instead of being biased at the same level as the EAM, and still produce a measurable response. This reduces the overall current densities in the device and increases reliability. The optical tap may be slightly forward biased, approximately +0.5V, and the DC component of the detected current may be removed through synchronous detection. This lowers the current density through the optical tap, yet still provides for a signal directly proportional to the optical intensity with a sufficient S/N.

Alternatively, a low frequency variation in the optical tap current may be induced by a low frequency AC bias provided to the optical tap. The amplitude of the AC bias signal may be set to cause the absorption of the optical to sweep along the steep portion of the absorption curve when centered. The extinction ratio of the EAM may then be maximized by adjusting the DC bias level to maximize the peak-to-peak current of the optical tap.

Another exemplary method to overcome possible difficulties calculating the desired DC bias level is the use of both input and output optical taps, as shown in FIG. 13. This dual tap method allows a differential measurement technique to be used. For example, one may divide the currents measured by the output optical tap 1316 and input optical tap 1314, as shown in equation (1).

$$i_{out} = P_{out}(1 - e^{-\alpha v_{out}\lambda L}) \qquad (1)$$

$$i_{in} = P_{in}(1 - e^{-\alpha v_{in}\lambda L})$$

$$v_{out} = v_{in}$$

$$\frac{i_{out}}{i_{in}} = \frac{P_{out}}{P_{in}}$$

In equation (1), i represents optical tap current, P represents the optical power, α is a constant related to the material, v represents the bias voltage, λ is the wavelength of the optical signal, and L is the length of the optical tap.

A simple op-amp circuit may be designed to provide a DC bias voltage based on a comparison of the input optical tap current and the output optical tap current, thereby performing steps 1402, 1404, and 1406. This differential measurement may have the additional advantage that it is independent of temperature, wavelength, and laser input power. Optical tap measurement and E/R calculation circuitry 1302 may be designed as a simple op-amp circuit to adjust the bias voltage to keep the extinction ratio constant. Alternatively, other general-purpose control circuitry, such as a digital signal processor, may be employed as optical tap measurement and E/R calculation circuitry 1302 to adjust the bias voltage and/or the temperature of monolithic stabilized EAM 100 to maintain a constant extinction ratio. Synchronous detection may also be used to improve the S/N ratio of the current signal from the optical taps, possibly allowing shorter taps with less optical signal loss.

For increase flexibility a VOA and/or SOA may be incorporated before the first optical tap to allow for variable input intensity into the EAM. FIG. 14 includes control of an integrated SOA as an alternate process, but it may be understood by one skilled in the art that an integrated VOA may be controlled in the same manner. This integrated VOA and/or SOA may be a separate electro-optical device, optically coupled to monolithic stabilized EAM 100, or it may be formed monolithically as part of the same waveguide structure as modulator section 112 and input and output optical taps 1314 and 1316.

The amount of amplification current to be supplied to the integrated SOA is determined and varied based on the input, or output, tap current to maintain a predetermined level of input, or output, tap current, step 1408. The amplification current is then supplied to the integrated SOA, step 1410, to maintain the desired input optical power level for the EAM.

FIG. 15 illustrates an exemplary method of controlling a tunable EAM system, such as the tunable EAM system illustrated in FIG. 13. The method begins by supplying bias voltage to the optical taps 1314 and 1316 and modulator section 112, step 1500, and supplying a temperature control voltage to temperature control element 1312, step 1508. The current from the optical taps is measured, step 1502, and the extinction ratio is calculated, step 1504, similarly to step 1402 and 1404 in the exemplary method of FIG. 14.

At the same time, temperature sensor 1310 is sampled to determine the temperature of monolithic stabilized EAM 100, step 1510. Temperature controller 1304 then sets the temperature control voltage level supplied to temperature control element 1312 to control the temperature of monolithic stabilized EAM 100 at a desired operating temperature, step 1512. The process then returns to step 1510.

The exemplary method of FIG. 15 provides to control variables, DC bias and temperature, to control the extinction ratio of the EAM. Optical tap measurement and E/R calculation circuitry 1302 determines new target values for DC bias, step 1506, and operating temperature, step 1514, based on the extinction ratio. Therefore, in the exemplary method of FIG. 15, optical tap measurement and E/R calculation circuitry 1302 preferably includes general-purpose control circuitry, such as a digital signal processor.

Once any desired changes to the control variables have been made in steps 1506 and/or 1514, the process recycles through steps 1502, 1504, 1506 and 1514. If the operating temperature is varied in step 1514, then the new operating temperature is set in temperature controller 1304 and the process proceeds to step 1510, as well as step 1502.

Although the embodiments of the invention described above have been mostly in terms of stabilized EAM's, it is contemplated that similar concepts may be practiced with other optical components. Also, it will be understood to one skilled in the art that a number of other modifications exist which do not deviate from the scope of the present invention as defined by the appended claims.

What is claimed:

1. A monolithic stabilized electroabsorption modulator, comprising:
   a substrate including a top substrate surface;
   a waveguide layer coupled to the top surface of the substrate and including;
   an electroabsorption medium, which interacts with light of the predetermined wavelength, responsive to an electric signal;
   an output optical tap section, including a portion of the electroabsorption medium; and
   a modulation section adjacent to the output optical tap section, the modulation section including an modulation portion of the electroabsorption medium; and
   a semiconductor layer coupled to the waveguide layer;
   wherein the electric signal is applied between the substrate and the semiconductor layer.

2. The monolithic stabilized electroabsorption modulator of claim 1, wherein the electroabsorption medium is a quantum well structure formed of a plurality of sub-layers of semiconductor material.

3. The monolithic stabilized electroabsorption modulator of claim 2, wherein the waveguide layer further includes:
   an input expansion/contraction (E/C) section, including a portion of the quantum well structure, wherein the quantum well structure in the input E/C section has an E/C thickness which varies within the input E/C section;
   an output E/C section located adjacent to the output optical tap section opposite from the modulation section and including a portion of the quantum well structure, wherein the quantum well structure in the output E/C section has the E/C thickness which varies within the output E/C section.

4. The monolithic stabilized electroabsorption modulator of claim 1, wherein the waveguide layer further includes:
   an input optical tap section located adjacent to the modulation section opposite from the output optical tap section and including a portion of the electroabsorption medium.

5. The monolithic stabilized electroabsorption modulator of claim 1, further comprising:
   a base electrode coupled to the substrate;
   a modulator electrode coupled to the semiconductor layer opposite the modulation section of the waveguide layer; and
   an output tap electrode coupled to the semiconductor layer opposite the output optical tap section of the waveguide layer;
   wherein the base electrode and the modulator electrode are configured to receive the electric signal.

6. A tunable electroabsorption modulator (EAM) system, comprising:
   a monolithic stabilized EAM, including;
      a substrate;
      a waveguide layer coupled to the substrate and including;
         an output optical tap section defined by an output tap electrode; and
         a modulation section defined by a modulation electrode;
      a semiconductor layer coupled to the waveguide layer;
      a temperature control element coupled to the substrate; and
      a temperature sensor coupled to the substrate;
   a tap current monitor electrically coupled to the output tap electrode of the monolithic stabilized EAM to measure the tap current;
   extinction ratio calculation circuitry coupled to the tap current monitor and adapted to determine a bias voltage of the output optical tap section and the modulation section of the monolithic stabilized EAM and an operating temperature of the monolithic stabilized EAM based on the output tap current;
   a bias controller coupled to the extinction ratio calculation circuitry and electrically coupled to the output tap electrode and the modulator electrode of the monolithic stabilized EAM to supply the bias voltage determined by the extinction ratio calculation circuitry to the output optical tap section and the modulation section of the monolithic stabilized EAM; and
   a temperature controller coupled to the extinction ratio calculation circuitry and the temperature control element and the temperature sensor of the monolithic stabilized EAM to control the temperature of the monolithic stabilized EAM at the operating temperature determined by the extinction ratio calculation circuitry.

* * * * *